(12) United States Patent
Karppi et al.

(10) Patent No.: US 11,066,546 B2
(45) Date of Patent: Jul. 20, 2021

(54) GLYOXYLATED POLYACRYLAMIDE POLYMER COMPOSITION, ITS USE AND METHOD FOR INCREASING THE STRENGTH PROPERTIES OF PAPER, BOARD OR THE LIKE

(71) Applicant: Kemira Oyj, Helsinki (FI)

(72) Inventors: Asko Karppi, Turku (FI); Matti Hietaniemi, Espoo (FI); Martina Halinen, Helsinki (FI); Salla Timperi, Kirkkonummi (FI); Vladimir Grigoriev, Cologne (DE); Mikko Virtanen, Helsinki (FI)

(73) Assignee: Kemira Oyj, Helsinki (FI)

( * ) Notice: Subject to any disclaimer, the term of this patent is extended or adjusted under 35 U.S.C. 154(b) by 84 days.

(21) Appl. No.: 16/468,307

(22) PCT Filed: Jul. 5, 2017

(86) PCT No.: PCT/FI2017/050506
§ 371 (c)(1),
(2) Date: Jun. 12, 2019

(87) PCT Pub. No.: WO2018/122446
PCT Pub. Date: Jul. 5, 2018

(65) Prior Publication Data
US 2020/0079950 A1    Mar. 12, 2020

(30) Foreign Application Priority Data
Dec. 28, 2016  (WO) .................. PCT/FI2016/050927

(51) Int. Cl.
C08L 33/26 (2006.01)
D21H 17/55 (2006.01)
D21H 21/20 (2006.01)
D21H 23/04 (2006.01)

(52) U.S. Cl.
CPC .............. *C08L 33/26* (2013.01); *D21H 17/55* (2013.01); *D21H 21/20* (2013.01); *D21H 23/04* (2013.01)

(58) Field of Classification Search
None
See application file for complete search history.

(56) References Cited

U.S. PATENT DOCUMENTS

| | | | | |
|---|---|---|---|---|
| 3,556,932 A | * | 1/1971 | Coscia et al. ............. | C08F 8/28 162/166 |
| 5,365,775 A | * | 11/1994 | Penniman ............ | D21G 9/0009 162/198 |
| 2005/0187356 A1 | * | 8/2005 | Hagiopol .................. | C08F 8/28 525/329.4 |
| 2008/0308242 A1 | | 12/2008 | Lu et al. | |
| 2018/0327974 A1 | * | 11/2018 | Lewis .................... | D21H 21/20 |

FOREIGN PATENT DOCUMENTS

| RU | 2581862 C2 | 4/2016 |
|---|---|---|
| WO | 2013107933 A1 | 7/2013 |
| WO | 2015075318 A1 | 5/2015 |

OTHER PUBLICATIONS

European Patent Office, International Search Report of PCT/FI2016/050927 dated Mar. 23, 2017, 5 pages.

* cited by examiner

*Primary Examiner* — Dennis R Cordray
(74) *Attorney, Agent, or Firm* — Meunier Carlin & Curfman LLC

(57) ABSTRACT

A cationic glyoxylated polyacrylamide polymer composition having improved storage stability for use in manufacture of paper, board or the like, which aqueous composition includes a glyoxylated polyacrylamide polymer having a cationic charge density in a range of 0.8-1.8 meq/g of dry polymer in dry content of 5-15% and a buffering acid. The aqueous composition has pH in a range of 2.2-4.0 and a viscosity of less than 80 mPas measured at 25° C. by using a Brookfield viscometer after 30 days storage at 35° C. or after 60 days storage at 23° C.

17 Claims, No Drawings

GLYOXYLATED POLYACRYLAMIDE POLYMER COMPOSITION, ITS USE AND METHOD FOR INCREASING THE STRENGTH PROPERTIES OF PAPER, BOARD OR THE LIKE

PRIORITY

This application is a U.S. national application of the international application number PCT/FI2017/050506 filed on Jul. 5, 2017 and claiming priority of International application PCT/FI2016/050927 filed on Dec. 28, 2016 the contents of all of which are incorporated herein by reference.

The present invention relates to a glyoxylated polyacrylamide polymer composition having improved storage stability and its use, as well as to method for increasing strength properties of paper, board or the like.

Glyoxylated polyacrylamide (GPAM) is generally used in a variety of paper grades to enhance the dry and temporary wet strength. Glyoxylated polyacrylamide is also applied to increase the compression strength and the dimensional stability of many board-grade paper products. In many cases also drainage or press section dewatering may be improved simultaneously with the strength improvements. Also strength of wet web may be improved allowing higher running speed of the web.

It is known that glyoxylated polyacrylamide compositions have challenges in their commercial use. Glyoxylated polyacrylamide composition is typically transported and stored in a form of an aqueous solution. To provide glyoxylated polyacrylamides with sufficient storage stability, the dry content of the glyoxylated polyacrylamide is typically about 7-7.5%. Transportation costs of GPAM compositions increase due to large volumes. In addition, the GPAM compositions are not totally stable, but glyoxal still tends to continue cross-linking the polyacrylamide base polymer and thus the viscosities of the aqueous solutions tend to increase during storage and leading finally to gel-formation. So, the GPAM compositions have limited shelf-life and after gel-formation the compositions cannot be used anymore. Further, elevated temperature will accelerate the gel-formation and so the shelf-life is even more limited.

Therefore, there is a need for GPAM compositions with the reasonable concentrations and reasonable storage stability.

Generally glyoxylated polyacrylamide composition is prepared by reacting glyoxal with a polyacrylamide base polymer in slightly alkaline aqueous solution and stabilizing under acidic conditions. When the desired extent of the glyoxylation is reached, typically about a half of the added glyoxal remains unreacted in the finished composition. When using the glyoxylated polyacrylamide composition as an additive in the paper or board manufacturing, the unreacted glyoxal, i.e. so-called free glyoxal, will remain in the papermaking water circulation and finally end up to the waste water treatment process.

In case glyoxal is present in the final product in amounts of 1 weight-% or more, the product may need to be classified and labelled as Germ cell mutagenicity, category 2: "Suspected of causing genetic defects". Additionally, 1 weight-% content of glyoxal in the final product may cause the product to be classified and labelled as Skin sensitisation, category 1: "May cause an allergic skin reaction". These classifications are based on Globally Harmonized System (GHS) indicating the current classification criteria, and are valid globally in countries which have implemented this regulation, such as European countries, the United States of America and several Asian countries.

Mutagenicity and skin sensitisation classification limits significantly uses of GPAM composition in paper and board manufacturing in above defined countries. Therefore, there also is a market need for GPAM compositions, which contain unreacted glyoxal less than 1 weight-%.

It is an object of the present invention to reduce or even eliminate the above-mentioned problems appearing in prior art.

It is especially an object of the present invention to provide a storage-stable cationic glyoxylated polyacrylamide polymer composition with a cationic charge density in the range of 0.8-1.8 meq/g of dry polymer.

It is also an object of the present invention to provide a storage-stable cationic glyoxylated polyacrylamide polymer composition preferably with unreacted glyoxal below 1 weight-%.

A further object of the invention is to provide a method for preparing a storage-stable cationic glyoxylated polyacrylamide polymer composition at high polymer solids content and also preferably with unreacted glyoxal below 1 weight-%

A further object of the invention is also to provide a cationic glyoxylated polyacrylamide polymer composition and a method which increase strength properties of the final paper or board.

In order to achieve among others the objects presented above, the invention is characterized by what is presented in the enclosed independent claims.

Some preferred embodiments of the invention will be described in the other claims.

Typical cationic glyoxylated polyacrylamide polymer composition according to the invention for use in manufacture of paper, board or the like comprises a glyoxylated polyacrylamide polymer having a cationic charge density in the range of 0.8-1.8 meq/g of dry polymer, in a dry content amount of 5-15%, an aqueous medium, and a buffering acid, and optionally a mineral acid, and the aqueous composition has a pH value in the range of 2.2-4.0.

Typical use of a cationic glyoxylated polyacrylamide polymer composition according to the present invention is for improving strength properties of a paper, board or the like.

Typical method for increasing the strength properties of paper, board or the like, comprises obtaining a fibre stock, adding a cationic glyoxylated polyacrylamide polymer composition according to the present invention to the fibre stock, and forming the fibre stock into paper, board or the like.

Now it has been surprisingly found out that the cationic glyoxylated polyacrylamide (GPAM) polymer composition at high polymer solids content having storage stability after 30 days storage at 35° C. or after 60 days storage at 23° C. can be obtained. Especially, it has been found the good storage stability can be provided to the cationic glyoxylated polyacrylamide (GPAM) polymer composition at high polymer solids content and with unreacted glyoxal below 1 weight-1%. Further, it has been found out that a cationic GPAM composition which has good storage stability and high concentration at the same time and preferably unreacted glyoxal below 1 weight-%, requires reasonable low molecular weight of the polyacrylamide base polymer, high enough reaction rate of glyoxal in glyoxylation and also buffering of the GPAM composition. These features may allow the glyoxylation to be continued to higher viscosity compared to preparation of conventional glyoxylated polyacrylamides, at least to 17 mPas or more measured at 25° C. by using a Brookfield viscometer, which corresponds to higher molecular weight of the glyoxylated polyacrylamide. Due to the increased molecular weight of the glyoxylated polyacrylamide, better strength performance in paper, board or the like is expected.

The cationic glyoxylated polyacrylamide polymer composition of the present invention may be obtained e.g. by using polyacrylamide base polymer having a weight average molecular weight MW in the range of 4000-12 000 g/mol and by allowing over 50% of added glyoxal to react during glyoxylation reaction. Thus, a typical aqueous composition of the cationic glyoxylated polyacrylamide polymer according to the invention may be prepared by the method comprising reacting glyoxal with a polyacrylamide base polymer having a weight average molecular weight in the range of 4000-12 000, preferably in the range of 5000-11 000 g/mol and more preferably 6000-10 000 g/mol and even more preferably 6500-9000 g/mol in alkaline aqueous solution, and terminating the glyoxylation reaction when the aqueous composition has a viscosity of 17-27 mPas and preferably 20-25 mPas measured at 25° C. by using a Brookfield viscometer by adding a buffering acid, and optionally a mineral acid, to the aqueous composition of the glyoxylated polyacrylamide polymer for stabilizing pH in the range of 2.2-4.0.

The cationic GPAM composition according to the present invention has an improved storage stability, which can be substantiated from an aqueous solution of the composition after at least 30 days storage at 35° C. or after 60 days storage at 23° C. by measuring viscosity of the aqueous composition. The composition has the viscosity of less than 80 mPas measured on a Brookfield viscometer after 30 days storage at 35° C. or after 60 days storage at 23° C. In addition, the aqueous composition according to the invention has a pH value in the range of 2.2-4.0, preferably in the range of 2.5-3.5 and more preferably in the range of 2.8-3.5 for providing the stable glyoxylated polyacrylamide composition with desired viscosity. The pH of the composition will be in these ranges also after storage period, i.e. after at least 30 days storage at 35° C. or after 60 days storage at 23° C.

The cationic GPAM composition of the invention is in form of an aqueous solution and according to an embodiment of the invention the composition has a viscosity of less than 80 mPas measured on a Brookfield viscometer after 45 days and preferably after 60 days storage at 35° C. The composition according to the invention has a viscosity of less than 80 mPas measured on a Brookfield viscometer even after 90 days or after 120 days storage at 23° C. In one embodiment of the invention, the cationic glyoxylated polyacrylamide polymer composition has a viscosity of less than 50 mPas measured on a Brookfield viscometer after 30 days storage at 35° C. or after 60 days storage at 23° C. These viscosity properties refer to the surprisingly good storage stability of the glyoxylated polyacrylamide compositions of the present invention at high polymer solids content. The better storage stability is naturally achieved at lower temperatures and shelf-life can be substantially much longer. The improved storage stability of the glyoxylated polyacrylamide polymer composition makes possible longer transportation trips and higher storage temperature and, of course, allows the longer shelf-life before use. The viscosity values indicated in the present application are measured at 25° C. by using Brookfield DV1 viscometer equipped with small sample adapter and spindle SC4-S18 at maximum rpm.

The dry content of the glyoxylated polyacrylamide polymer is 5-15%, preferably 6-13%, more preferably 8-12%, and even more preferably 9-11%. An aqueous cationic glyoxylated polyacrylamide polymer composition according to the invention is storage stable with 5-15%, 6-13% or 8-13%, preferably 8-12% or 9-12%, more preferably 9-11%, and even more preferably about 10% dry content of the glyoxylated polyacrylamide polymer. The high solids content of the composition is economical in view of storage and transport due to the reduced volumes of the transported solutions.

The GPAM composition of the invention has to be sufficient cationic charge to provide an affinity to fibres in the stock. The present invention provides a composition for increasing paper strength in papermaking process, said composition comprising a cationic glyoxylated polyacrylamide, which has a cationic charge density of 0.8-1.8 meq/g, preferably in the range of 1.0-1.7, and more preferably in the range of 1.1-1.5 meq/g dry polymer. According to one preferable embodiment a cationic glyoxylated polyacrylamide has a cationic charge density of 1.1, 1.2, 1.3, 1.4 or 1.5 meq/g dry polymer. Charge density of the cationic glyoxylated polyacrylamide is determined by charge titration, using polyethylene sulfonate solution as titrant and using Mütek PCD-03 or equivalent device for end point detection. The storage stability of the composition may be improved by using even higher cationic charges, but the charge density over 2.5 meq/g will lead to problems in paper or board manufacturing process such as foaming, or the strength properties of the final product may decrease. In some cases even over 2.0 or 1.8 meq/g may be too cationic and will lead to problems. Thus, there is also a need to avoid high cationicity of the GPAM and the risk of over-cationization when the GPAM is used in papermaking even at elevated dosages, especially when dosed to fibre stocks having zeta potential relatively close to zero or when wet strength resin or cationic starch is dosed high amounts to the fibre stock. In other words, if the charge density was higher than 1.8 meq/g, it might not be possible to dose the polymer enough to the fibre stock to reach adequate dry strength or temporary wet strength to the paper or board, without causing over-cationization. It is important to avoid over-cationization as it may result in loss of drainage, increased deposits in paper machine parts, increased foaming in white water, reduced strength properties and increased risk of dusting. If the charge density of the cationic glyoxylated polyacrylamide is below 0.8 meq/g, the desired storage stability will not be achieved. It has been observed that the charge density of the cationic glyoxylated polyacrylamide in the range of 0.8-1.8 meq/g will improve storage stability of the cationic GPAM composition by controlling of the viscosity increase of the GPAM composition.

The cationic glyoxylated polyacrylamide composition according to the invention may be prepared by reacting glyoxal with a polyacrylamide base polymer having a weight average molecular weight MW in the range of 4000-12 000, preferably in the range of 5000-11 000 g/mol and more preferably 6000-10 000 g/mol and even more preferably 6500-9000 g/mol in alkaline aqueous solution and stabilizing under acidic conditions. The weight average molecular weight MW of the polyacrylamide base polymer is carefully selected in order to provide optimal function in the composition. Paper strength tends to weaken where the base polymer molecular weight is too low. Too high molecular weight results in either decreased stability of the GPAM composition, or unreacted glyoxal level of 1 weight-% or more in the composition.

The weight average molecular weight MW is determined by size-exclusion chromatography (SEC) using Agilent 1100 SE chromatography equipment with integrated pump, autosampler and degasser. Eluent is a buffer solution (0.3125 M $CH_3COOH$+0.3125 M $CH_3COONa$) with a flow rate of 0.5 ml/min at 35° C. Typical sample concentration is 2-4 mg/ml, with an injection volume of 50 µl. Ethylene glycol (1 mg/ml) is used as a flow marker. Column set consists of three columns (a TSKgel PWXL guard column and two TSKgel GMPWXL columns). Refractive index detector by Agilent is used for detection (T=35° C.). Molecular weight is determined using conventional (column) calibration with poly(ethylene oxide)/poly(ethylene glycol) narrow molecular weight distribution standards (Polymer Standards Service).

The polyacrylamide base polymer is in the form of an aqueous solution. According to one embodiment of the invention the polyacrylamide base polymer solution has a Brookfield viscosity of 50-170 mPas, preferably 60-150 mPas and more preferably 70-130 mPas, at solids content of 40%. The viscosity values are measured at 25° C. by using Brookfield DV1 viscometer equipped with small sample adapter and spindle SC4-S18 at maximum rpm.

The polyacrylamide base polymer may be a copolymer of acrylamide and at least one cationic monomer. The base polymer may be prepared by solution polymerisation. According to one embodiment of the invention the polyacrylamide base polymer may be prepared by solution polymerisation of acrylamide and at least one cationic monomer, which is selected from diallyl dimethyl ammonium chloride (DADMAC), [3-(acrylamide)propyl]trimethyl-ammonium chloride (APTAC), and [3-(methacrylamido)propyl]trimethyl-ammonium chloride (MAPTAC) and combinations thereof. These cationic monomers have hydrolytic stability which improves the stability of the GPAM composition according to the invention. Preferably, the polyacrylamide base polymer is prepared by solution polymerisation of acrylamide and diallyldimethylammonium chloride (DADMAC). The cationic glyoxylated polyacrylamide may comprise only one type of cationic monomers, or it may comprise more than one type of cationic monomers.

A cationic charge density of the polyacrylamide corresponds to an amount of cationic polymers in a base polymer. The polyacrylamide base polymer may comprise at least 9 mol-%, preferably at least 10 mol-% and more preferably at least 12 mol-% of cationic monomers. According to one embodiment of the invention the polyacrylamide base polymer comprises 9-40 mol-%, preferably 10-30 mol-%, more preferably 12-25 mol-% and even more preferably 12-20 mol-% of cationic monomers. Storage stability of the GPAM composition according to the invention is improved with high amount of cationic monomers, but high amount of cationic monomers may decrease strength response of paper with furnishes which contain low zeta-potential value. The amount of cationic monomers is selected to optimise the binding of the polymer to the fibres in the stock and thus the dry strength effect which is obtained. The amount of cationic monomers in the base polymer is also selected to achieve required charge density.

According to one preferable embodiment the polyacrylamide base polymer is free of anionic monomers.

The acrylamide may be acrylamide or another primary amine-containing monomer, such as methacrylamide, ethylacrylamide, N-ethyl methacrylamide, N-butyl methacrylamide or N-ethyl methacrylamide or combinations thereof, preferably acrylamide.

According to one embodiment of the invention the amount of residual acrylamide monomer may be <500 mg/kg, <100 mg/kg, <50 mg/kg of dry base polymer. Acrylamide free or low acrylamide containing products are safe to use in the applications.

According to one embodiment of the invention the glyoxylated polyacrylamide polymer has a weight average molecular weight MW>250 000 g/mol and preferably >300 000 g/mol for providing the GPAM composition which increases paper strength in papermaking process. The weight average molecular weight MW is determined by size-exclusion chromatography (SEC) as described above in the present application.

One characteristic which also impacts on storage stability of the cationic glyoxylated polyacrylamide composition according to the invention is the glyoxal to acrylamide unit molar ratio in the glyoxylated polyacrylamide. According to one embodiment of the invention the glyoxal to acrylamide unit molar ratio which is in the range of 0.50-0.65 and preferably in the range of 0.56-0.63. The amount of the glyoxal will also affect to the desired strength properties achieved by the composition. The molar ratio according to the present invention is to provide sufficient amount of glyoxal per amide unit for building up the molecular weight of the GPAM to improve its dry strength performance when used in papermaking, and on the other hand for controlling the amount of amide groups available after glyoxylation, as these groups are reactive and may affect the stability of the polymer composition. At the same time the amount of glyoxal per amide unit is kept low enough in order to control the amount of unreacted glyoxal in the polymer composition, which is required for product safety of both the polymer composition and the paper made using it, and for stability i.e. control of viscosity increase of the GPAM composition. The upper limit for the amount of the glyoxal may be dependent on the requirement of unreacted glyoxal below 1 weight-% in the composition.

The cationic glyoxylated polyacrylamide polymer composition according to one embodiment of the invention may comprise less than 50 weight-%, preferably less than 45 weight-%, more preferably less than 40 weight-%, and even more preferably less than 37 weight-% of unreacted glyoxal based on the total amount of the glyoxal in the composition. One advantage of low content of unreacted glyoxal is in improved drainage and dry strength performance, since glyoxal cross-linking will increase the molecular weight. Also strength performance is less dependent on paper making pH, when glyoxal is cross-linking more the base polymer. Conventional glyoxylated polyacrylamides with high amount of unreacted glyoxal have required pH below 7 for good operation, because strength was based more on glyoxal making covalent bonds with the fibres than on formation of ionic bonds by the cationic groups of the glyoxylated polyacrylamide. Now, the invention is also generating dry strength up to pH 8, which is relevant for paper and board grades having calcium carbonate filler or recycled fibre in furnish.

In a typical method for preparing the cationic glyoxylated polyacrylamide polymer composition according to the invention the glyoxal is added to an aqueous solution of the polyacrylamide polymer to cause glyoxalation. The glyoxal may preferably be added in one step. The glyoxalation may be carried out by batch process at temperature of about 20-40° C. and pH about 8.0-9.5.

According to one embodiment of the invention, at least 50% and preferably at least 60% of the added glyoxal may be reacted with the polyacrylamide base polymer during the glyoxylation reaction. When a desired viscosity is achieved, the glyoxylation reaction can be terminated by acid quenching by lowering solution pH to about 3. For achieving the storage stability properties according to the present invention, the glyoxylation reaction may be terminated when the aqueous solution of the composition has a viscosity of 17-27 mPas and preferably 20-25 mPas measured at 25° C. by using Brookfield DV1 viscometer equipped with small sample adapter and spindle SC4-S18 at maximum rpm. A dry content of the glyoxylated polyacrylamide polymer in the aqueous solution is 5-15%, preferably 6-13%, more preferably 8-12% and even more preferably 9-11%. A cationic glyoxylated polyacrylamide polymer composition according to the invention has a viscosity of 17-27 mPas measured at 25° C. by using a Brookfield viscometer directly after glyoxylation. Also, the concentration of the unreacted glyoxal in the final GPAM composition is dependent on the reaction between the added glyoxal and the polyacrylamide base polymer.

One characteristic of the cationic glyoxylated polyacrylamide polymer composition and the glyoxylation reaction, is that the weight average molecular weight (MW) is more than 250 000 g/mol, or preferably more than 300 000 g/mol, based on SEC/GPC determination using PEO (polyethyleneoxide) calibration. If MW is lower than 250 000 g/mol, then crosslinking due to glyoxal is not sufficient and strength response in application is not adequate.

A pH of the glyoxylated polyacrylamide (GPAM) composition of the invention is controlled by using a buffering acid, optionally also a mineral acid such as sulphuric acid, which is added after glyoxylation to the aqueous composition. Buffering acid is preferred because it provides buffering effect in the acidic pH range, which is desired for the stability of the composition, and it may also provide termination of the glyoxylation reaction when used alone, or together with a mineral acid. Typically, a buffering acid is an aqueous solution comprising an organic acid and/or salt thereof. According to one embodiment of the invention, the buffering acid comprises formic acid or citric acid, or any salt thereof, like sodium formiate or sodium citrate. The solution comprises formic acid preferably in an amount of 10-200 mmol/l and more preferably 20-150 mmol/l, or citric acid preferably in an amount of 5-100 mmol/l and more preferably 10-60 mmol/l. The buffering increases the stability of aqueous solution of the GPAM composition by preventing the pH value from increasing over the storage period of at least 30 or 60 days and so preventing the gel-formation. Typically, the pH of the composition is regulated between 2.2 and 4.0 by using the buffering acid. If the pH of the aqueous composition is higher than 3.5 or especially higher than 4.0, there is a risk for gel-formation.

According to one preferable embodiment of the invention an aqueous composition of cationic glyoxylated polyacrylamide polymer comprising
  a glyoxylated polyacrylamide polymer having a cationic charge density in the range of 0.8-1.8 meq/g of dry polymer, in a dry content amount of 5-15%,
is prepared by the method comprising
  reacting glyoxal with a polyacrylamide base polymer in alkaline aqueous solution, wherein the polyacrylamide base polymer comprising at least 9 mol-% of cationic monomers selected from diallyldimethylammonium chloride (DADMAC), 3-(acrylamidopropyl)trimethylammonium chloride (APTAC), 3-(methacrylamidopropyl)trimethylammonium chloride (MAPTAC) and combinations thereof, and wherein the polyacrylamide base polymer has a viscosity of 50-170 mPas, preferably 60-150 mPas and more preferably 70-130 mPas measured at 25° C. by using a Brookfield viscometer at solids content of 40%, and
  terminating the glyoxylation reaction, when the aqueous solution has a viscosity of 17-27 mPas and preferably 20-25 mPas measured at 25° C. by using a Brookfield viscometer by adding a buffering acid, and optionally a mineral acid, to the aqueous composition for stabilizing pH in the range of 2.2-4.0.

In one preferred embodiment an aqueous composition of cationic glyoxylated polyacrylamide polymer further comprises an unreacted glyoxal in an amount of below 1 weight-% by the total weight of the composition.

The present invention also provides for increasing the strength properties such as dry strength, temporary wet strength and tensile strength properties, of paper, board or the like, comprising
  obtaining a fibre stock,
  adding a glyoxylated polyacrylamide polymer composition according to any of the invention to the fibre stock, and
  forming the fibre stock into paper, board or the like.

The cationic glyoxylated polyacrylamide polymer composition may be added in an amount of 0.5-4 kg as dry composition/ton dry stock, preferably 1-3 kg as dry composition/ton dry stock. The GPAM composition according to the present invention may be added to the stock as an aqueous solution without any preliminary dilution. According to one embodiment of the invention the GPAM composition may be added to fibre stock comprising at least 50 weight-% of unbleached kraft pulp, bleached kraft pulp or recycled pulp. According to one embodiment of the invention the fibre stock has a zeta potential in the range of −25 mV-+10 my, preferably −15 mV-+10 mV, before addition of the cationic glyoxylated polyacrylamide polymer composition. Especially recycled fibre material may have zeta potential closer to zero, in which case it is not possible to add cationic strength resin in sufficient amount to provide the required strength. The medium cationic GPAM according to the invention may be used in higher dosages, without over-cationization, so it is beneficial especially for fibre stocks having the specified zeta potential, and for fibre stocks comprising elevated amounts, even up to 100%, of recycled fibre materials. According to one embodiment zeta potential of the fibre stock is negative. When the cationic glyoxylated polyacrylamide polymer composition is added to a fibre stock having negative zeta potential especially good temporary wet strength and dry strength is achieved to the paper or board. The GPAM composition of the invention has a cationic charge density which provides optimal dosage of the GPAM composition in the stock in order for reaching adequate dry strength or temporary wet strength.

The glyoxylated polyacrylamide polymer composition of the invention may be added to the fibre stock at any suitable location, for example at any suitable wet end location, to produce a paper or fibre stock product with increased strength. The fibre stock may also be called pulp slurry or pulp suspension. The GPAM composition of the invention may be added to the papermaking process at any point where such strength additives are generally added. The composition is preferably added as an aqueous solution. The GPAM composition may be added at any time before the paper web is formed. The addition of the glyoxylated polyacrylamide polymer composition can be made to thick stock or thin stock. Preferably time between the addition and the web forming is less than about 20 min. Typical addition point is machine chest pump or headbox fan pump. Optionally anionic strength additive can be added before or after GPAM addition. GPAM can be dosed as original concentration or it can be diluted further to improve mixing to the stock.

In an exemplary embodiment the method comprises the steps of forming an aqueous suspension of cellulosic fibres, such as pulp, adding an amount of the GPAM composition to said suspension, forming the cellulosic fibres into a sheet and drying the sheet to produce a paper.

The composition according to present invention is suitable for improving dry strength of tissue, board or fine paper.

The method of the present invention may be applied to any kind of paper and board making processes. All suitable kinds and grades of papers and boards are included, such as e.g. newsprint, linerboard, corrucating medium, folding box board, white lined chip board, core board, tissue paper, fine paper, super calendered (SC) paper, LWC paper, sack paper, and kraft paper, and other paper materials.

A better understanding of the present invention may be obtained through the following examples which are set worth to illustrate, but are not to be construed as the limit of the present invention.

EXPERIMENTAL

Analysis Methods:
Dry content was determined by Mettler Toldedo HR73 IR dryer, at 150° C.
Viscosity was determined by Brookfield DV1 viscometer, equipped with small sample adapter, spindle was SC4-S18, maximum rotation speed, temperature was 25° C.
pH was determined with calibrated pH meter.
The weight average molecular weight (MW) was determined by size-exclusion chromatography (SEC) using Agilent 1100 SE chromatography equipment with integrated pump, autosampler and degasser. Eluent is a buffer solution (0.3125 M $CH_3COOH$+0.3125 M $CH_3COONa$) with a flow rate of 0.5 ml/min at 35° C. Typical sample concentration is 2-4 mg/ml, with an injection volume of 50 µl. Ethylene glycol (1 mg/ml) is used as a flow marker. Column set consists of three columns (a TSKgel PWXL guard column and two TSKgel GMPWXL columns). Refractive index detector by Agilent is used for detection (T=35° C.). Molecular weights are determined using conventional (column) calibration with poly(ethylene oxide)/poly (ethylene glycol) narrow molecular weight distribution standards (Polymer Standards Service).
Unreacted glyoxal was determined using the method described in the article of Zhu et al. "HPLC determination of glyoxal in aldehyde solution with 3-methyl-2-benzothiazolinone hydrazone" (Front. Chem. Sci. Eng. 2011, 5(1): 117-121) using UPLC. 1.2 ml of aqueous dilution of sample or glyoxal standard is diluted to 20 ml with freshly prepared MBTH solution, and kept in water bath of 70° C. for 110 min to form yellow diazine. Analysis by Acquity UPLC BEH C18 1.7 µm, 2.1 mm×50 mm, 2 µl injection, 0.4 ml/min; UV-detection at 410 nm.
Residual acrylamide was determined by HPLC.

Example 1

Polyacrylamide Base Polymer (BP-1) for GPAM Series 1 (DADMAC Content 12.5 Mol-% of Monomers (24.5 wt-% of Monomers))

Water (140 g), diallyldimethylammonium chloride (DADMAC) 65 wt-% aqueous solution (31.0 g), diethylenetriaminepenta-acetic acid (DTPA) 40 wt-% aqueous solution (0.52 g), and citric acid (0.84 g) are fed into the 1 liter glass reactor, equipped with mechanical mixer and a jacket for heating and cooling. pH is adjusted to 4.5-5.0 with sodium hydroxide solution (20 wt-%). The mixture is heated to 100° C. Small nitrogen flow is put on. Acrylamide (AMD) 50 wt-% aqueous solution (459 g) and DADMAC 65 wt-% aqueous solution (84.2 g) are fed into monomer tank and mixed for 5 min. Ammonium persulfate (APS) solution is made into catalyst 1 tank by dissolving APS (4.76 g) in water (35.0 g). Sodium metabisulfite (MBS) solution is made into catalyst 2 tank by dissolving MBS (9.59 g) in water (34.2 g). Catalyst 1 (APS), catalyst 2 (MBS), and monomer mixture (AMD/DADMAC) feeds are started simultaneously, when water is boiling/refluxing clearly and temperature is 100° C. Reaction time starts. Feed time for catalyst 1 (APS) is 130 min. Feed time for catalyst 2 (MBS) is 120 min. Feed time for monomer mixture (AMD/DADMAC) is 105 min. Temperature of the reaction mixture is kept at 100° C. and the mixture must be refluxed during catalyst and monomer feed. Reaction mixture is kept at 100° C. for 45 min, when catalyst 1 feed has been ended. Product (BP-1) is cooled below 25° C.

Dry content of BP-1 was 40.0 wt-%, viscosity of the solution was 159 mPas and pH was 3.8. Molecular weight average (MW) was 8400 g/mol by SEC analysis. Unreacted acrylamide was not detected in the polymer solution and the amount was below detection limit 5 mg/kg solution. Unreacted acrylamide corresponds to value below 12.5 mg/kg of dry material.

Cationic Glyoxylated Polyacrylamide Polymer Composition Series 1, Glyoxylation of Base Polymer BP-1

GPAM products are produced by the following procedure. BP-1 and water are dosed into a reactor. The mixture is mixed for 5 min. pH is adjusted to 7-8 with NaOH 10 wt-%-solution (about 1.2 g). Glyoxal is added to the reactor. The mixture is mixed for 5 min. Temperature is adjusted to 23-26° C. pH is adjusted to 8.7-9.2 with NaOH 32 wt-% solution. Viscosity is monitored in the function of reaction time. If pH decreases below 8.7, it is then re-adjusted to about 9.0 with NaOH 32 wt-% solution. Total amount of NaOH 32% solution is about 4 g. Temperature is kept at 23-26° C. during glyoxylation reaction. When viscosity is increased to target value, then reaction is stopped by immediately adding either sulphuric acid solution (20 wt-%) and/or formic acid and pH is decreased to about 3.0. Dry content, viscosity, pH and unreacted glyoxal and MWr were determined.

Material amounts, molar ratio of glyoxal to amide in base polymer and glyoxal concentration at the start are presented in the table 1. Determined values are in the table 2. The GPAM products 1-A and 1-B are unbuffered references.

TABLE 1

GPAM series 1.

| Substance | Product | | | | | |
|---|---|---|---|---|---|---|
| | GPAM 1-A Amount, g | GPAM 1-B Amount, g | GPAM 1-C Amount, g | GPAM 1-D Amount, g | GPAM 1-E Amount, g | GPAM 1-F Amount, g |
| BP-1 (40.0 wt-%) | 177.1 | 179.6 | 182.9 | 180.6 | 181.9 | 177.1 |
| Water | 734.4 | 734.4 | 734.4 | 737.7 | 737 | 735.7 |
| Glyoxal (40.0 wt-%) | 66.52 | 64.06 | 64.1 | 63.0 | 61.9 | 66.5 |
| Formic acid (25 wt-%) | 0.0 | 0.0 | 3.7 | 3.7 | 4.2 | 5.6 |
| Molar ratio, Glyoxal/Amide | 0.64 | 0.61 | 0.61 | 0.60 | 0.58 | 0.64 |
| Glyoxal start, wt-% | 2.66 | 2.56 | 2.56 | 2.52 | 2.47 | 2.66 |

TABLE 2

Determined values of GPAM series 1.

| Product | Formic acid (mmol/liter) | Dry content (%) | Viscosity (mPas) | pH | Charge density (meq/g, dry) | Unreacted glyoxal in composition (%) | Unreacted glyoxal of total glyoxal (%) |
|---|---|---|---|---|---|---|---|
| GPAM 1-A | 0 | 10.0 | 22 | 3.1 | ~0.95 | 0.99 | 37 |
| GPAM 1-B | 0 | 10.1 | 18 | 3.1 | ~0.95 | 0.99 | 39 |
| GPAM 1-C | 20 | 9.9 | 26 | 3.0 | ~0.95 | 0.98 | 38 |
| GPAM 1-D | 20 | 9.7 | 26 | 3.0 | ~0.95 | 0.93 | 37 |
| GPAM 1-E | 23 | 9.7 | 24 | 3.0 | ~0.95 | 0.90 | 36 |
| GPAM 1-F | 31 | 10.0 | 24 | 3.0 | ~0.95 | 0.98 | 37 |

The weight average molecular weight MW of GPAM 1-A was 464 200 g/mol and GPAM 1-B was 460 250 g/mol. Based on the similar dry contents and viscosities of all samples in Table 2, also the magnitude of the weight average molecular weight Mw of the samples may be expected to be similar.

Cationic glyoxylated polyacrylamide polymer compositions at dry content of about 10% and the amount of unreacted glyoxal of total glyoxal below 40% had unreacted glyoxal below 1 weight-% by the total weight of the composition.

GPAM series 1 product were stored at 23° C. and 35° C. pH and viscosities were determined during storage. pH and viscosities were determined at 25° C. The results are presented in Tables 3 and 4.

TABLE 3 pH stability of unbuffered GPAM of series 1 during storage at 23° C. and 35° C.

| | Product | | | |
|---|---|---|---|---|
| Time/days | GPAM 1-A 23° C. | GPAM 1-A 35° C. | GPAM 1-B 23° C. | GPAM 1-B 35° C. |
| 0 | 3.1 | 3.1 | 3.1 | 3.1 |
| 6 | 3.6 | 4.2 | 3.6 | 4.2 |
| 19 | 3.9 | 4.6 | 3.8 | 4.6 |
| 30 | — | — | 4.1 | — |

TABLE 4 pH stability of buffered GPAM of series 1 during storage at 35° C.

| Product | GPAM 1-C | GPAM 1-D | GPAM 1-E | GPAM 1-F |
|---|---|---|---|---|
| Glyoxal/AMD | 0.61 | 0.60 | 0.58 | 0.64 |
| Dry solids % | 9.9 | 9.7 | 9.7 | 10.0 |
| Formic acid, mM | 20 | 20 | 23 | 31 |
| Time/days | pH | pH | pH | pH |
| 0 | 3.0 | 3.0 | 3.0 | 3.0 |
| 8 | 3.3 | 3.2 | 3.2 | 3.0 |
| 20 | 3.3 | 3.2 | 3.1 | 3.0 |
| 33 | 3.3 | 3.2 | 3.1 | 3.0 |
| 49 | — | — | 3.3 | 3.1 |
| 60 | — | — | 3.3 | 3.1 | pH of unbuffered cationic glyoxylated polyacrylamide polymer compositions drifts upwards during storage. Drifting speed speeds up at higher temperature. Buffering facilitates keeping pH below 4 for 60 days at 35° C.

Buffering improves storage stability of the GPAM products as presented in Table 5.

TABLE 5

Viscosity stability of GPAM series 1 during storage at 35° C.

| | Product | | | | | |
|---|---|---|---|---|---|---|
| | GPAM 1-A | GPAM 1-B | GPAM 1-C | GPAM 1-D | GPAM 1-E | GPAM 1-F |
| Glyoxal/AMD | 0.64 | 0.61 | 0.61 | 0.60 | 0.58 | 0.64 |
| Dry solids % | 10.0 | 10.1 | 9.9 | 9.7 | 9.7 | 10.0 |
| Formic acid, mM | 0 | 0 | 20 | 20 | 23 | 31 |
| Days at 35° C. | mPas | mPas | mPas | mPas | mPas | mPas |
| 0 | 22 | 18 | 26 | 26 | 24 | 24 |
| 6 | 23 | 18 | — | — | — | — |
| 8 | — | — | 28 | 25 | 22 | 23 |
| 19 | gel | 27 | — | — | — | — |
| 20 | | — | 36 | 28 | 24 | 25 |
| 30 | | gel | — | — | — | — |
| 33 | | | 75 | 35 | 27 | 27 |
| 49 | | | gel | gel | 39 | 35 |
| 60 | | | | | 71 | 44 |

Example 2

Polyacrylamide Base Polymer (BP-2) for GPAM Series 2 (DADMAC Content 14.3 Mol-% of Monomers (27.5 wt-% of Monomers))

Water (148 g), diallyldimethylammonium chloride (DADMAC) 65 wt-% aqueous solution (32.1 g), diethylenetriaminepenta-acetic acid (DTPA) 40 wt-% aqueous solution (0.50 g), and citric acid (0.81 g) are fed into the reactor. pH is adjusted to 4.5-5.0 with sodium hydroxide solution (20 wt-%). The mixture is heated to 100° C. Small nitrogen flow is put on. Acrylamide (AMD) 50 wt-% aqueous solution (444 g) and DADMAC 65 wt-% aqueous solution (97.4 g) are fed into monomer tank and mixed for 5 min. Ammonium persulfate (APS) solution is made into catalyst 1 tank by dissolving APS (5.4 g) in water (35.0 g). Sodium metabisulfite (MBS) solution is made into catalyst 2 tank by dissolving MBS (10.9 g) in water (34.2 g). Catalyst 1 (APS), catalyst 2 (MBS), and monomer mixture (AMD/DADMAC) feeds are started simultaneously, when water is boiling/refluxing clearly and temperature is 100° C. Reaction time starts. Feed time for catalyst 1 (APS) is 130 min. Feed time for catalyst 2 (MBS) is 120 min. Feed time for monomer mixture (AMD/DADMAC) is 105 min. Temperature of the reaction mixture is kept at 100° C. and the mixture must be refluxed during catalyst and monomer dosings. Reaction mixture is kept at 100° C. for 45 min, when catalyst 1 feed has been ended. Product is cooled below 25° C. and then analysed.

Dry content was 40.0 wt-%, viscosity of the solution was 117 mPas and pH 3.5. Unreacted acrylamide was not detected in the polymer solution and the amount was below detection limit 5 mg/kg solution. Unreacted acrylamide corresponds to value below 12.5 mg/kg of dry material.

Cationic Glyoxylated Polyacrylamide Polymer Composition Series 2, Glyoxylation of Base Polymer BP-2

GPAM products are produced by the following procedure. BP-2 and water are dosed into a reactor. The mixture is mixed for 5 min. pH is adjusted to 7-8 with NaOH 10 wt-%-solution (about 1.2 g). Glyoxal is added to the reactor. The mixture is mixed for 5 min. Temperature is adjusted to 23-26° C. pH is adjusted to 8.7-9.2 with NaOH 32 wt-%-solution. Viscosity is monitored in the function of reaction time. If pH decreases below 8.7, it is then re-adjusted to about 9.0 with NaOH 32 wt-% solution. Total amount of NaOH 32% solution is about 4 g. Temperature is kept at 23-26° C. during glyoxylation reaction. When viscosity is increased to target value, then reaction is stopped by immediately adding formic acid (99%). Dry content, viscosity, pH and free glyoxal (unreacted glyoxal) was determined.

Material amounts, molar ratio of glyoxal to amide in base polymer and glyoxal concentration at the start are presented in the Table 6. Determined values are presented in the Table 7. Storage stability of the GPAM products is presented in Tables 8 and 9.

TABLE 6

GPAM series 2.

| | Product | | |
|---|---|---|---|
| Substance | GPAM 2-A Amount, g | GPAM 2-B Amount, g | GPAM 2-C Amount, g |
| BP-2 (40 wt-%), g | 184.6 | 186.2 | 187.9 |
| Water, g | 744.2 | 744.2 | 744.0 |
| Glyoxal (40 wt-%), g | 62.1 | 60.5 | 59.0 |
| Formic acid (99%), g | 4.2 | 4.2 | 4.2 |
| Molar ratio glyoxal/Amide | 0.60 | 0.58 | 0.56 |
| Glyoxal at start, wt-% | 2.48 | 2.42 | 2.36 |

TABLE 7

Determined values of GPAM series 2.

| Product | GPAM 2-A | GPAM 2-B | GPAM 2-C |
|---|---|---|---|
| Molar ratio glyoxal/AMD | 0.60 | 0.58 | 0.56 |
| Formic acid, mM | 90 | 90 | 90 |
| Dry solids, % | 9.91 | 10.1 | 10.2 |
| Viscosity, mPas | 24.2 | 23.5 | 23 |
| pH | 3.0 | 3.0 | 3.0 |
| Charge density, meq/g, dry | ~1.2 | ~1.2 | ~1.2 |
| Unreacted glyoxal in composition, % | 0.80 | 0.77 | 0.81 |
| Unreacted glyoxal of total glyoxal, % | 32.0 | 31.8 | 34.1 |

TABLE 8

Viscosity and pH stability of GPAM of series 2 during storage at 35° C.

| Storage time Days | GPAM 2-A Viscosity, mPas | GPAM 2-A pH | GPAM 2-B Viscosity, mPas | GPAM 2-B pH | GPAM 2-C Viscosity, mPas | GPAM 2-C pH |
|---|---|---|---|---|---|---|
| 0 | 24.2 | 3.0 | 23.5 | 3.00 | 23.0 | 3.00 |
| 23 | 22.2 | 3.16 | 21.0 | 3.21 | 22.3 | 3.17 |
| 57 | 24.4 | 3.29 | 23.7 | 3.30 | 26.4 | 3.26 |
| 86 | 24.9 | 3.25 | 24.5 | 3.27 | 28.9 | 3.28 |
| 104 | 25.1 | 3.26 | 23.5 | 3.28 | 23.9 | 3.27 |

GPAM with unreacted glyoxal content less than 1.0 wt-% and storage stability at 35° C. over 100 days can be maintained when viscosity of polyacrylamide base polymer is below 120 mPas at 40% concentration and unreacted glyoxal is below 35 wt-% of the total glyoxal and the GPAM is buffered.

TABLE 9

Viscosity and pH stability of GPAM of series 2 during storage at 23° C.

| Storage time Days | GPAM 2-A Viscosity, mPas | GPAM 2-A pH | GPAM 2-B Viscosity, mPas | GPAM 2-B pH | GPAM 2-C Viscosity, mPas | GPAM 2-C pH |
|---|---|---|---|---|---|---|
| 0 | 24.2 | 3.0 | 23.5 | 3.0 | 23.0 | 3.0 |
| 23 | 22.9 | 3.15 | 21.6 | 3.14 | 21.5 | 3.12 |
| 63 | 24.2 | 3.31 | 22.8 | 3.32 | 23.1 | 3.27 |
| 86 | 24.7 | 3.27 | 23.3 | 3.29 | 23.2 | 3.27 |
| 104 | 25.1 | 3.28 | 24.6 | 3.31 | 33.3 | 3.28 |

Example 3

Polyacrylamide Base Polymer (BP-3) for GPAM Series 3 (DADMAC Content 24.2 Mol-% of Monomers (42.0 wt-% of Monomers))

Water (168 g), diallyldimethylammonium chloride (DADMAC) 65 wt-% aqueous solution (53.2 g), diethylen-etriaminepenta-acetic acid (DTPA) 40 wt-% aqueous solution (0.62 g), and citric acid (0.81 g) are fed into the reactor. pH is adjusted to 4.5-5.0 with sodium hydroxide solution (20 wt-%). The mixture is heated to 100° C. Small nitrogen flow is put on. Acrylamide (AMD) 50 wt-% aqueous solution (356.6 g) and DADMAC 65 wt-% aqueous solution (144.7 g) are fed into monomer tank and mixed for 5 min. Ammonium persulfate (APS) solution is made into catalyst 1 tank by dissolving APS (4.4 g) in water (32.3 g). Sodium metabisulfite (MBS) solution is made into catalyst 2 tank by dissolving MBS (8.8 g) in water (31.5 g). Catalyst 1 (APS), catalyst 2 (MBS), and monomer mixture (AMD/DADMAC) feeds are started simultaneously, when water is boiling/refluxing clearly and temperature is 100° C. Reaction time starts. Feed time for catalyst 1 (APS) is 130 min. Feed time for catalyst 2 (MBS) is 120 min. Feed time for monomer mixture (AMD/DADMAC) is 105 min. Temperature of the reaction mixture is kept at 100° C. and the mixture must be refluxed during catalyst and monomer dosings. Reaction mixture is kept at 100° C. for 45 min, when catalyst 1 feed has been ended. Product is cooled below 25° C. and then analysed.

Dry content was 40.0 wt-%, viscosity of the solution was 99 mPas and pH was 3.9. Unreacted acrylamide was not detected in the polymer solution and the amount was below detection limit 5 mg/kg solution. Unreacted acrylamide corresponds to value below 12.5 mg/kg of dry material.

Cationic Glyoxylated Polyacrylamide Polymer Composition Series 3, Glyoxylation of Base Polymer BP-3

GPAM products are produced using the procedure described in example 2. Material amounts, molar ratio of glyoxal to amide in polyacrylamide base polymer and glyoxal concentration at the start are presented in the Table 10.

Determined values are presented in the Table 11. Storage stability of the GPAM products is presented in Table 12.

TABLE 10

GPAM series 3.

| | Product | |
|---|---|---|
| Substance | GPAM 3-A Amount, g | GPAM 3-B Amount, g |
| BP-3 (40 wt-%) | 189.0 | 191.4 |
| Water | 746.3 | 746.3 |
| Glyoxal (40 wt-%) | 57.8 | 55.5 |
| Formic acid (99%) | 1.86 | 1.86 |
| Molar ratio glyoxal/Amide | 0.68 | 0.64 |
| Glyoxal at start, wt-% | 2.31 | 2.22 |

TABLE 11

Determined values of GPAM series 3.

| Product | GPAM 3-A | GPAM 3-B |
|---|---|---|
| Molar ratio glyoxal/AMD | 0.68 | 0.64 |
| Formic acid, mM | 40 | 40 |
| Dry solids, % | 9.97 | 9.90 |
| Viscosity, mPas | 24.3 | 23.4 |
| pH | 2.99 | 3.00 |
| Charge density, meq/g, dry | ~1.8 | ~1.8 |
| Unreacted glyoxal in composition, % | 0.87 | 0.81 |
| Unreacted glyoxal of total glyoxal, % | 37.7 | 36.5 |

TABLE 12

Viscosity and pH stability of GPAM of series 3 during storage at 23° C.

| Storage time Days | GPAM 3-A Viscosity, mPas | GPAM 3-A pH | GPAM 3-B Viscosity, mPas | GPAM 3-B pH |
|---|---|---|---|---|
| 0 | 24.3 | 2.99 | 23.4 | 3.00 |
| 37 | 22.4 | 3.22 | 22.2 | 3.22 |
| 120 | 22.8 | 3.31 | 21.8 | 3.31 |

GPAM solution with unreacted glyoxal level below 1.0 wt-% and storage stability at 23° C. more than 120 days is achieved when the amount of unreacted glyoxal is less than 40% of the total glyoxal.

Example 4: Application Example

Test pulp was consisted 70% *eucalyptus* bleached hardwood kraft pulp refining degree SR 23 and 30% pine bleached kraft pulp refining degree SR 20. Pulp mixture properties are presented at Table 13.

TABLE 13

Properties of pulp mixture.

| pH | 6.81 |
|---|---|
| Turbidity, NTU | 0.8 |
| Conductivity, µS/cm | 1099 |
| Cationic demand, µekv/l | 18.28 |
| Zeta potential, mV | −18.0 |
| Consistency, g/l | 4.9 |

For the preparation of laboratory sheets the stock was diluted to 0.5 consistency with conductivity controlled water and for the test pulp of Zeta-potential the stock was diluted to 2.0% consistency with conductivity controlled water. Conductivity controlled water was made from tap water by adding NaCl until water reached conductivity of 1500 ρS/cm. pH of diluted pulps was adjusted to 7.0 by NaOH. Strength composition was added 60 s before sheet forming. Hand sheets having basis weight of 80 g/m² were formed by using Rapid Köthen sheet former with tap water dilution in accordance with ISO 5269-2:2012. The basis weight of the sheets was adjusted by the volume of the thin stock and the amount of stock portion was kept constant. The sheets were dried in vacuum dryers for 6 minutes at 92° C. and at 1000 mbar. Before testing the laboratory sheets were pre-conditioned for 24 h at 23° C. in 50% relative humidity, according to ISO 187. Used pulp and sheet testing devices and standards are given in Table 14. The indexed strength value is the strength divided by basis weight of the paper/board.

TABLE 14

Pulp and sheet testing devices and standards.

| Property/Measurement | Device/Standard |
|---|---|
| pH | Knick Portamess 911 |
| Turbidity (NTU) | WTW Turb 555IR |
| Conductivity (mS/cm) | Knick Portamess 911 |
| Charge (µekv/l) | Mütek PCD 03 |
| Zeta potential (mV) | Mütek SZP-06 |
| Consistency (g/l) | ISO 4119 |
| Basis weight | Mettler Toledo/ISO 536 |
| Ash content, 525° C. | ISO 1762 |
| Wet immediate tensile strength | Lorentzen & Wettre Tensile tester/ISO 3781: 2011, 1 min immerse time |
| Tensile strength | Lorentzen & Wettre Tensile tester/ISO 1924-3 |

Tested strength chemical compositions are presented at Table 15. GPAM ref has charge density 1.8 meq/g dry and unreacted glyoxal content of 1.2 wt-%. Test points and results are presented at Table 16. Test points 1-4 are reference points. In Table 16 Zeta-potential of test point 4 is positive and indicates overdosage that would cause difficulties like foaming, deposits or sheet release problems in paper making process. GPAM compositions according to the invention give higher dry tensile strength values at 2-4 kg/t dry dosages. Also immediate wet tensile at 2-4 kg/t dry dosages are similar or better.

TABLE 15

Tested compositions.

| Composition | GPAM ref | GPAM 1-C | GPAM 1-E | GPAM 1-F |
|---|---|---|---|---|
| Dry material, % | 12.5 | 9.9 | 9.7 | 10.0 |
| Viscosity, mPas | 23 | 26 | 24 | 24 |
| pH | 3.4 | 3.0 | 3.0 | 3.0 |

TABLE 16

Test points and results.

| Test No. | GPAM ref. kg/t dry | GPAM 1-3 kg/t dry | GPAM 1-6 kg/t dry | GPAM 1-7 kg/t dry | Zeta potential mV | Tensile index Nm/g | wet imm. tensile index Nm/g |
|---|---|---|---|---|---|---|---|
| 1 | 0 | | | | −90 | 45.4 | 0.9 |
| 2 | 1 | | | | −74 | 50.4 | 3.4 |
| 3 | 2 | | | | −38 | 53.0 | 5.0 |
| 4 | 4 | | | | 11 | 57.5 | 6.7 |
| 5 | | 1 | | | −81 | 51.2 | 3.2 |
| 6 | | 2 | | | −67 | 55.0 | 5.0 |
| 7 | | 4 | | | −34 | 56.7 | 6.9 |
| 8 | | | 1 | | −82 | 48.9 | 3.3 |
| 9 | | | 2 | | −62 | 55.2 | 5.2 |
| 10 | | | 4 | | −25 | 57.0 | 7.5 |
| 11 | | | | 1 | −78 | 49.3 | 3.5 |
| 12 | | | | 2 | −61 | 54.9 | 5.2 |
| 13 | | | | 4 | −29 | 59.2 | 7.6 |

The invention claimed is:

1. A cationic glyoxylated polyacrylamide polymer composition, comprising:
   a glyoxylated polyacrylamide polymer having a glyoxal to acrylamide unit molar ratio in a range of 0.50-0.65, a weight average molecular weight MW>250,000 g/mol, and a cationic charge density in a range of 0.8 meq/g-1.8 meq/g of dry polymer, in a dry content amount of 5%-15%;
   an aqueous medium;
   a buffering acid;
   an unreacted glyoxal in an amount of below 1 weight-% by a total weight of the composition; and
   the aqueous composition has a pH in a range of 2.2-4.0.

2. The composition according to claim 1, wherein the dry content of the glyoxylated polyacrylamide polymer is 9-11%.

3. The composition according to claim 1, wherein the composition has a viscosity of less than 80 mPas measured at 25° C. by using a Brookfield viscometer after 30 days.

4. The composition according to claim 1, wherein the composition has a viscosity of less than 50 mPas measured at 25° C. by using a Brookfield viscometer after 30 days storage at 35° C. or after 60 days storage at 23° C.

5. The composition according to claim 1, wherein the glyoxylated polyacrylamide polymer has a cationic charge density in a range of 1.0 meq/q-1.7 meq/g of dry polymer.

6. The composition according to claim 1, wherein the aqueous composition has a pH in a range of 2.8-3.5.

7. The composition according to claim 1, wherein the glyoxylated polyacrylamide polymer has a weight average molecular weight MW>300 000 g/mol.

8. The composition according to claim 1, wherein the composition comprises less than 50 weight-% of unreacted glyoxal based on total glyoxal.

9. The composition according to claim 1, wherein the buffering acid is an aqueous solution comprising formic acid in an amount of 10 mmol/l-200 mmol/l or citric acid in an amount of 5 mmol/l-100 mmol/l.

10. A method for producing an aqueous composition of a cationic glyoxylated polyacrylamide polymer according to claim 1, comprising:
reacting glyoxal with a polyacrylamide base polymer in an alkaline aqueous solution, wherein the polyacrylamide base polymer having a weight average molecular weight MW in a range of 4000 g/mol-12,000 g/mol and comprising 9 mol-%-20 mol-% of cationic monomers is selected from diallyldimethylammonium chloride (DADMAC), 3-(acrylam idopropyl)trimethyl-ammonium chloride (APTAC), 3-(methacrylamidopropyl) trimethyl-ammonium chloride (MAPTAC) and combinations thereof, and wherein the polyacrylamide base polymer has a viscosity of 50 mPas-170 mPas measured at 25° C. by using a Brookfield viscometer at solids content of 40%, and
terminating the glyoxylation reaction, when the aqueous solution has a viscosity of 17 mPas-27 mPas measured at 25° C. by using the Brookfield viscometer by adding a buffering acid, and optionally a mineral acid, to the aqueous composition of the glyoxylated polyacrylamide polymer for stabilizing the pH in a range of 2.2-4.0.

11. The method according to claim 10, wherein the polyacrylamide base polymer comprises 12 mol-%-20 mol-% of cationic monomers.

12. The method according to claim 10, wherein the polyacrylamide base polymer has a weight average molecular weight MW in a range of 6000 g/mol-10,000 g/mol.

13. A method for increasing the strength properties of paper, board or the like, comprising:
obtaining a fibre stock,
adding a cationic glyoxylated polyacrylamide polymer composition according to claim 1 to the fibre stock, and
forming the fibre stock into paper, board or the like.

14. The method according to claim 13, wherein the fibre stock has a zeta potential in a range of −25 mV-+10 mV before addition of the cationic glyoxylated polyacrylamide polymer composition.

15. The method according to claim 14, wherein zeta potential of the fibre stock is negative.

16. The method according to claim 13, wherein the glyoxylated polyacrylamide polymer composition is added in an amount of 0.5 kg-4 kg as dry composition/ton dry stock.

17. The method according to claim 13, wherein the polymer composition is added to the fibre stock comprising at least 50 weight-% of unbleached kraft pulp, bleached kraft pulp or recycled pulp.

* * * * *